United States Patent [19]

Saalmann et al.

[11] Patent Number: 4,486,910

[45] Date of Patent: Dec. 11, 1984

[54] METERING METHOD FOR SUPPLYING DETERGENT CONCENTRATE

[75] Inventors: Günter Saalmann, Gevelsberg; Richard Haslberger, Hallabruck, both of Fed. Rep. of Germany

[73] Assignee: Lang Apparatebau GmbH, Siegsdorf, Fed. Rep. of Germany

[21] Appl. No.: 371,132

[22] Filed: Apr. 23, 1982

[30] Foreign Application Priority Data

May 13, 1981 [DE] Fed. Rep. of Germany ....... 3118973

[51] Int. Cl.$^3$ ............................................. D06F 39/02
[52] U.S. Cl. ......................................................... 8/158
[58] Field of Search .................... 8/158; 68/17 R, 207; 134/57 R, 57 D, 100, 101

[56] References Cited

U.S. PATENT DOCUMENTS

| | | | |
|---|---|---|---|
| 2,540,431 | 2/1951 | Davis et al. | 68/17 R X |
| 2,793,940 | 5/1957 | Bennett | 68/17 R X |
| 2,816,427 | 12/1957 | Vela | 68/17 R |
| 2,879,143 | 3/1959 | Thurman | 68/17 R X |
| 2,968,172 | 1/1961 | Johnson | 68/17 R |
| 3,044,285 | 7/1962 | Koplin | 68/17 R X |
| 3,645,669 | 2/1972 | Rausch | 68/17 R X |
| 3,729,013 | 4/1973 | Anderson | 68/17 R X |

*Primary Examiner*—Philip R. Coe
*Attorney, Agent, or Firm*—Hammond & Littell, Weissenberger & Dippert

[57] ABSTRACT

A method and apparatus for supplying dry detergent concentrate to a metering device for dissolving or dispersing in water which prevents or minimizes the formation of dust, lumping, caking, and encrustation of vessel walls and supplies new detergent to the laundry plant in response to changes in electrical conductivity of the wash water from a predetermined value which indicates consumption of original detergent required in soil removal and need for replenishment thereof. The minimizing of dust and protection of the detergent from moisture is accomplished by using a flexible delivery container, the filling means and emptying means of which are sealable and which emptying means acts in cooperation with the metering apparatus section to form an integral delivery system which is generally isolated from the surrounding atmosphere.

2 Claims, 1 Drawing Figure

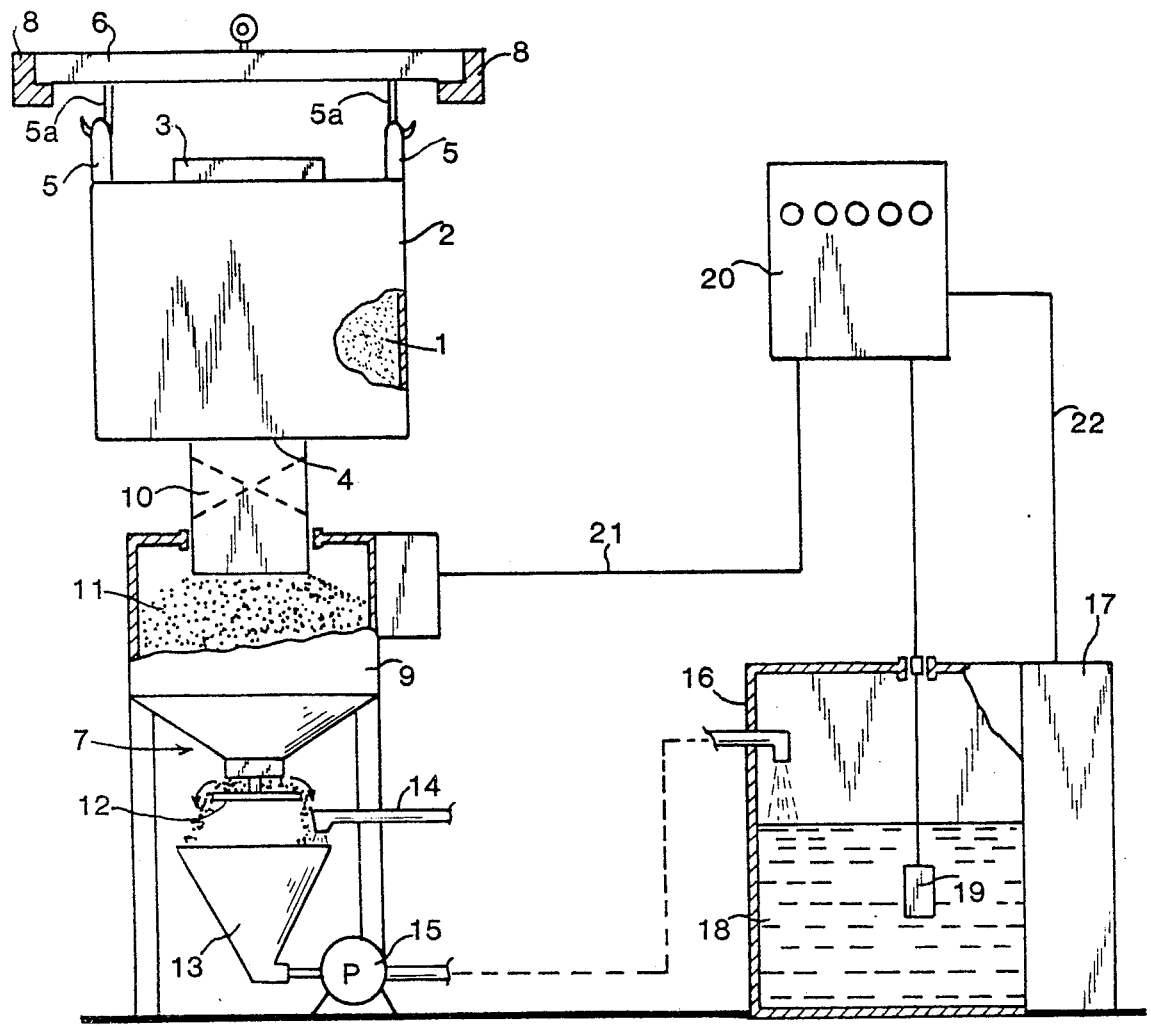

METERING METHOD FOR SUPPLYING DETERGENT CONCENTRATE

BACKGROUND OF THE INVENTION

The present invention concerns a metering method and apparatus for supplying a commercial washing apparatus or laundry with water-soluble or water insoluble powdered or granulated detergent concentrate from a delivery container to the storage bin of the metering apparatus where portions of the detergent are dissolved in or mixed with water and then conveyed to the commercial washing machine or laundry.

The terms "washing machine" and "detergent" are understood to be used here in a general sense and are understood to comprise rinsing and cleaning machines and rinsing and cleaning agents respectively.

The metering methods presently employed in supplying detergents has an operator fill the storage bin of the metering device by hand from the delivery container. The metering devices are electrically or pneumatically driven and operate with water as a conveying and/or solvent medium for the detergent. In some methods the detergent is metered to the wash water by hand, simply so much per given time. Another metering device uses the conductivity of the wash water and detergent added when change beyond a predetermined point occurs. The powdered or granulated material is constantly fed into a hopper where it is mixed with water and flows from the latter by gravity feed into the laundry wash water (see German Pat. No. 1,542,298). There are also devices where the replenishment of detergent is simply a function of time. A given weight of detergent is mixed with water and added to the wash water by pumping it to the washing machine. Finally metering devices are presently used which flush detergent from the storage bin with water and the resultant mixture conveyed to the washing machine by means of a pump or by gravity feed.

A disadvantage of the known detergent metering methods and apparatus is in most cases the formation of dust during the filling of the storage bin on the metering device. Furthermore, the hygroscopic detergent is exposed during the open transportation to the high humidity of the surrounding air, which can lead to lumping and caking. The lifting and transportation of relatively heavy delivery containers (e.g., paper bags of about 55 lbs.) used in the operation of commercial washing machines represents a considerable burden for the operators, particularly in the case of large consumers with a daily requirement of several hundred lbs. of detergent. In the presently used devices with time-dependent metering, where there is no indication of the concentration used, the amount of detergent required, which may be higher or lower depending on the degree of soiling, is not taken into account. The flushing of the detergent from the storage bins with water leads frequently to lumping and encrustation, which can make more difficult or prevent the conveyance of the mixture.

OBJECTS OF THE INVENTION

An object of the present invention is to provide a metering method and apparatus for supplying detergent to a commercial laundry.

Another object of the present invention is to provide a means for transferring powdered or granular detergent from the container in which it is supplied to the storage bin of the metering device without creating significant dust.

A further object of the present invention is to provide a delivery container capable of protecting the detergent from exposure to wetness and high humidity until it is delivered to the storage bin of the metering device prior to mixing it with water.

Another object of the present invention is to provide a method and apparatus by which powdered or granular detergent is transferred from a delivery container to a storage bin of a metering device without creating dust, said detergent being protected from wetness and highly humid air from its arrival at the laundry plant until its mixture with water prior to adding the mixture to the wash water.

These and other objects of the invention will become more apparent as the description thereof proceeds.

THE DRAWING

The drawing is a schematic representation of one embodiment of the present invention.

DESCRIPTION OF THE INVENTION

The present invention concerns a metering method and apparatus by means of which a powdered or granular detergent concentrate is conveyed from a storage bin to a metering device where it is transformed, preferably under controlled addition of water as a conveying medium and/or solvent in a fixed ratio by weight, into a pumpable mixture. The aqueous detergent mixture is then transferred by means of a pump into the commercial laundry plant, the amount of said aqueous detergent provided being dependent on a predetermined value of the electrical conductance of the aqueous detergent wash solution in the commercial laundry. The detergent, even when not soluble in water, is at least partly dissolved in the conveying medium.

A device for carrying out the method is characterized according to another feature of the invention by the apparatus comprising a preferably flexible delivery container for the powdered or granular detergent concentrate which can be suspended above the storage bin of the metering device, and the connection of the delivery container with the storage bin by means of a pour hole which empties through a flexible, closable channel between the bottom of the delivery container and the head of the storage bin.

By means of the method and arrangement for carrying out the method it is possible to move the detergent supply, e.g., of a commercial washing machine under conditions which are dust-free and without any substantial risk of lumping or caking or encrustation of the vessel walls by the detergent. Particularly when using a delivery container with an opening at the bottom, and a constrictable channel leading to the storage bin of the metering device and having a suspension means for the delivery container, physical strain can be substantially avoided by using lifting devices, like fork lifts.

The detergent concentrates to be metered according to the invention comprise soluble and insoluble products, including those detergents or washing aids, such as perborate which can not be metered in liquid form as stock solutions, because of their chemical reaction.

The schematic drawing represents one of the preferred embodiments of the present invention showing the spatial relationship between parts and the general features of an apparatus in which the present invention can be carried out.

The powdered or granular detergent 1 is supplied in delivery container 2. The capacity of said container may range up to several hundred pounds. The delivery container 2 preferably consists of a suitable, strong, flexible material such as plastic coated fiber mat, or of paper, having a closable filling means 3 and an emptying means 4, the flow from which can be stopped by constricting of the tubular canal 10 which may be attached to the delivery container or may be molded as a part thereof. The delivery container 2 may have a polygonal or a round base.

The filled delivery container 2 is attached to supporting frame 6 by means of lugs 5 provided on its upper surface and adapted to cooperate with hooks 5a attached to supporting frame 6. It is positioned above metering device 7 in a mount 8. Delivery container 2 can be placed into position for suspension by means of a fork-lift or chain hoist with a guide rail at a place above the metering device 7 on supporting frame 6 held up by mount 8.

The filling of storage bin 9 on metering device 7 is effected over pour hole 4 and tubular canal 10. The latter can be closed by constricting it in the manner indicated by broken lines. The supply of the powder or granular material 1 from delivery container 2 stops automatically when said material forms pouring cone 11 and fills the entire cross section of the opening of tubular canal 10. Flow starts again when detergent 1 is taken from storage bin 9 and the opening of canal 10 is correspondingly cleared.

During the metering, that is, after the drive of metering device 7 has been turned on, detergent 1 trickles continuously over a rotating sprinkling disk 12 into a flushing hopper 13, where it is transformed to a pumpable mixture by the addition of water from a water supply 14. The mixture is fed by means of pump 15 into washing tank 16 of washing plant 17.

The detergent concentration of laundering, wash water solution 18 in washing tank 16 is transformed in the embodiment by a measuring probe 19 into an electrical signal, and transmitted to an electrical control 20. Control 20 should preferably contain several program options. When the actual value of the detergent concentration drops below the pre-set value in the selected program of electronic control 20, this is transmitted correspondingly over line 21, metering device 7 is activated, meters detergent-water mixture to the laundering wash water until this pre-set value has been reattained and then shuts off. All parts to be controlled, e.g., sprinkling disk 12, the amount of water, pump 15 and storage vessel 9, if necessary, are effected by control 20 over line 21, corresponding to the requirements. Different pre-set concentration values can be transmitted in the latter over line 22 depending on the cleaning requirements of washing plant 17.

In connection with metering device 7 and when using a flexible delivery container 2 with an emptying means 4 at the bottom, delivery of detergent can be effected directly from the latter during the operation of the metering device. The volume of delivery container 2 can be a multiple of the volume of storage bin 9 on metering device 7. The flexibility of delivery container 2 ensures complete emptying with a corresponding design, without the necessity of operating on the poured material mechanically. Tubular canal 10 adjoining emptying means 4, and fill hole with a suitable diameter in storage bin 9 of metering device 7 cooperate to prevent the formation of dust in the vicinity of the apparatus. This dust protection at the same time acts as a seal against the penetration of usually humid air of the work place into the interior of the delivery container, tubular canal, or storage bin. Premature absorption of moisture by the detergent is therefore prevented. After constricting or tying-off tubular channel 10 at the boundary to emptying means 4, delivery container 2 can be separated from metering device 7. Delivery container 2 is at this point hermetically sealed.

When using a supporting frame 6 for the suspension of delivery container 2, it is possible to move and lift the container by means of a fork lift or chain hoist with guide rail thereby relieving the operators of heavy physical work. Large delivery containers, which are designed to be reusable, can be returned after emptying to the detergent manufacturer for re-filling.

By continuously measuring the concentration of laundering solution 18 it is possible to determine the actual need of detergent at any time. Detergent addition is effected according to the invention only when the concentration drops below the predetermined value of the laundering solution. The detergent consumption is thus directly related to the degree of soiling of the parts or fabrics to be cleaned.

The preceding specific embodiments are illustrative of the practice of the present invention. It is to be understood, however, that variations which may be obvious to those skilled in the art or suggested herein, may be employed without departing from the spirit of the invention or the scope of the appended claims.

We claim:

1. A method for supplying measured amounts of water soluble or water insoluble powdered or granular detergent concentrate to a commercial washing machine or laundry which comprises suspending a delivery container having a pour hole at its bottom above a storage means in a metering device having a rotating disk upon which detergent concentrate from the storage means falls; connecting a substantially dust-tight tubular closable channel from the bottom of said delivery container to the top of said storage means; providing detergent concentrate to said delivery container; closing and opening said closable channel to cause some or all of said detergent concentrate to move by gravity feed through said pour hole and said channel to said storage means; and metering the supply of said detergent concentrate by causing said detergent concentrate to move by gravity feed from said storage means onto the rotating disk and then into a hopper situated below said rotating disk, adding water to said hopper, mixing said detergent concentrate with said water in a predetermined ratio in the mixing means whereby said water acts as a solvent and/or conveying means, and pumping the resulting detergent concentrate-water mixture to the commercial washing machine or laundry, the moving of concentrate by gravity feed, adding of water, and pumping being activated in response to changes in a predetermined value in the electrical conductance of the wash water in the commercial washing machine or laundry.

2. A method as set forth in claim 1 wherein the degree of depletion of wash water detergent is measured as a function of its conductivity and detergent-water mixture added when conductivity varies more than a predetermined value.

* * * * *

UNITED STATES PATENT AND TRADEMARK OFFICE
CERTIFICATE OF CORRECTION

PATENT NO. : 4,486,910

DATED : December 11, 1984

INVENTOR(S) : GÜNTER SAALMANN et al.

It is certified that error appears in the above-identified patent and that said Letters Patent is hereby corrected as shown below:

Column 1, line 17, "agents" should read -- agents, --.

Column 1, line 36, "Finally" should read -- Finally, --.

Column 1, line 38, "mixture" should read -- mixture is --.

Column 2, line 50, "machine" should read -- machine, --.

Column 4, line 65, "added" should read -- is added --.

Signed and Sealed this

Third Day of September 1985

[SEAL]

Attest:

DONALD J. QUIGG

*Attesting Officer*  *Acting Commissioner of Patents and Trademarks - Designate*